United States Patent
Koreis

(10) Patent No.: US 10,160,533 B2
(45) Date of Patent: Dec. 25, 2018

(54) AIRCRAFT CABIN PRESSURE REGULATING SUBFLOOR

(71) Applicant: The Boeing Company, Chicago, IL (US)

(72) Inventor: Rocke R. Koreis, Seattle, WA (US)

(73) Assignee: The Boeing Company, Chicago, IL (US)

( * ) Notice: Subject to any disclaimer, the term of this patent is extended or adjusted under 35 U.S.C. 154(b) by 261 days.

(21) Appl. No.: 14/494,131

(22) Filed: Sep. 23, 2014

(65) Prior Publication Data

US 2016/0083072 A1    Mar. 24, 2016

(51) Int. Cl.
| | |
|---|---|
| B32B 3/12 | (2006.01) |
| B32B 3/26 | (2006.01) |
| B32B 7/04 | (2006.01) |
| B32B 7/12 | (2006.01) |
| B32B 7/14 | (2006.01) |
| B64C 1/00 | (2006.01) |
| B64C 1/18 | (2006.01) |
| B32B 37/12 | (2006.01) |
| B32B 37/14 | (2006.01) |
| B32B 38/04 | (2006.01) |

(52) U.S. Cl.
CPC ............... B64C 1/18 (2013.01); B32B 3/12 (2013.01); B32B 3/266 (2013.01); B32B 7/12 (2013.01); B32B 7/14 (2013.01); B32B 37/146 (2013.01); B32B 7/045 (2013.01); B32B 37/1292 (2013.01); B32B 2038/047 (2013.01); B32B 2250/03 (2013.01); B32B 2307/724 (2013.01); B32B 2307/7242 (2013.01); B32B 2605/18 (2013.01); B64C 2001/009 (2013.01); B64C 2001/0072 (2013.01)

(58) Field of Classification Search
CPC ..... B32B 3/12; B32B 15/14; B32B 2307/102; B32B 2605/18; G10K 11/172; G10K 11/168; Y10T 428/24165; E04C 2/365; E04C 2/36; E04C 2/34; E04C 2/284; E04B 2001/748; B29D 24/005; Y10S 493/966
USPC .............................................. 52/791.1, 793.1
See application file for complete search history.

(56) References Cited

U.S. PATENT DOCUMENTS

| | | | | |
|---|---|---|---|---|
| 3,166,149 A | * | 1/1965 | Hulse et al. ............. | E04B 1/86 181/292 |
| 4,235,303 A | * | 11/1980 | Dhoore ................. | B64D 33/02 181/214 |
| 4,271,219 A | * | 6/1981 | Brown ..................... | B32B 3/12 156/292 |

(Continued)

FOREIGN PATENT DOCUMENTS

WO    WO 99/05372    2/1999

*Primary Examiner* — Phi D A
*Assistant Examiner* — Omar F Hijaz
(74) *Attorney, Agent, or Firm* — Joseph M. Rolnicki; Evans & Dixon, L.L.C.

(57) ABSTRACT

An aircraft cabin subfloor construction has flow paths through the subfloor that vent air pockets trapped beneath an air impermeable floor mat on the subfloor where, due to a difference in pressure in the air pockets trapped beneath the floor mat and the air in the aircraft cabin above the floor mat, the air pockets would create bubbles or buckling in the floor mat. The venting of the air pockets beneath the floor mat by the flow paths eliminates the problem of bubbling or buckling in the floor mat.

8 Claims, 5 Drawing Sheets

(56) References Cited

U.S. PATENT DOCUMENTS

| | | | | |
|---|---|---|---|---|
| 4,313,524 A * | 2/1982 | Rose | .................. | E04B 1/84 |
| | | | | 181/222 |
| 4,421,811 A * | 12/1983 | Rose | .................. | B32B 3/12 |
| | | | | 156/182 |
| 4,465,725 A * | 8/1984 | Riel | .................. | B29D 24/005 |
| | | | | 181/292 |
| 4,470,863 A * | 9/1984 | Brown | .................. | B32B 15/14 |
| | | | | 156/250 |
| 5,041,323 A * | 8/1991 | Rose | .................. | B32B 3/12 |
| | | | | 181/292 |
| 5,414,232 A * | 5/1995 | Wilson | .................. | B32B 3/12 |
| | | | | 181/210 |
| 5,518,796 A * | 5/1996 | Tsotsis | .................. | B32B 3/12 |
| | | | | 428/116 |
| 6,827,180 B2 * | 12/2004 | Wilson | .................. | B23K 26/0048 |
| | | | | 181/292 |
| 7,419,031 B2 * | 9/2008 | Liguore | .................. | B32B 3/12 |
| | | | | 181/210 |
| 8,498,114 B2 | 7/2013 | Martini | | |
| 8,579,225 B2 * | 11/2013 | Mardjono | .................. | F02C 7/24 |
| | | | | 181/288 |
| 8,651,233 B2 * | 2/2014 | Ayle | .................. | G10K 11/172 |
| | | | | 181/292 |
| 8,800,714 B2 * | 8/2014 | Ichihashi | .................. | G10K 11/172 |
| | | | | 181/207 |
| 2002/0094412 A1 * | 7/2002 | Murray | .................. | B32B 3/12 |
| | | | | 428/116 |
| 2004/0074205 A1 * | 4/2004 | Stache | .................. | E04C 2/36 |
| | | | | 52/783.11 |
| 2006/0240217 A1 * | 10/2006 | Foss | .................. | B32B 33/00 |
| | | | | 428/97 |
| 2009/0176050 A1 * | 7/2009 | Wang | .................. | B32B 27/12 |
| | | | | 428/95 |

\* cited by examiner

AIRCRAFT CABIN PRESSURE REGULATING SUBFLOOR

FIELD

This disclosure pertains to an aircraft cabin subfloor construction where flow paths are provided through the subfloor to vent air pockets trapped beneath an air impermeable floor mat and the subfloor when the floor mat is adhered to the subfloor. The venting of the air pockets beneath the floor mat by the flow paths eliminates the problem of bubbling or buckling in the floor mat when the pressure in the aircraft cabin in flight is less than the air pressure in the air pockets.

BACKGROUND

Aircraft cabin floor mats, for example aircraft galley floor mats have a problem of bubbling and/or buckling during flight. The floor mat is air impermeable. The bubbling and/or buckling of the floor mat is caused by air trapped under the floor mat when the floor mat is first installed and adhered to the subfloor.

As represented in FIG. 1, when securing the air impermeable floor mat 2 to the top surface 4 of the subfloor, an adhesive 6, for example double sided tape is applied to the top surface 4 of the subfloor around the periphery of the subfloor. This creates a loop pattern of adhesive 6 on the top surface 4 of the subfloor. Additional adhesive may be applied to the top surface 4 of the subfloor inside the loop pattern of adhesive 6.

As represented in FIG. 2, the bottom surface of the air impermeable floor mat 2 is then positioned on the top surface 4 of the subfloor. The periphery of the air impermeable floor mat 2 is secured to the subfloor 4 by the loop pattern of adhesive 6 applied to the periphery of the subfloor 4. At times air filled voids or air pockets 8 are trapped between the floor mat 2 and the subfloor top surface 4 by the loop pattern of adhesive 6 that secures the periphery of the floor mat 2 to the subfloor top surface 4. When the floor mat 2 is first installed and taped down, the air filled voids or air pockets 8 trapped under the floor mat 2 are at ambient pressure. During manufacture of the aircraft, the ambient pressure is typically sea level pressure. When the aircraft is in flight and climbs to altitude, the aircraft cabin is adjusted to atmospheric pressure conditions of equivalent to about 8,000 feet which is reduced from that of the under-mat pressure during mat installation. The air pockets or air filled voids 8 beneath the floor mat 2 are therefore at a higher pressure than the aircraft air above the floor mat 2. Thus, the air pockets or air filled voids 8 trapped beneath the floor mat 2 expand due to the lower pressure above the floor mat 2. This results in bubbling and/or buckling of the floor mat 2 as represented by the dashed lines in FIG. 2. This bubbling and/or buckling of the floor mat 2 detracts from the appearance of the floor mat 2 in the aircraft cabin and introduces a potential for passenger or flight crew tripping over the bubbles and/or buckling in the aircraft cabin.

A current solution is to add more adhesive 6 or double sided tape between the bottom surface of the air impermeable floor mat 2 and the top surface 4 of the subfloor. However, even adding more adhesive 6 between the air impermeable floor mat 2 bottom surface and the subfloor top surface 4 cannot guarantee that all trapped air between the floor mat 2 and subfloor 4 is eliminated and bubbling and/or buckling may still occur. Additionally, adhering or taping the entire bottom surface of the air impermeable floor mat 2 to the top surface 4 of the subfloor makes it difficult to replace the floor mat 2 when needed.

Providing the floor mat 2 with small perforations to allow trapped air pockets to escape from between the floor mat 2 and the subfloor 4 through the floor mat perforations is also problematic. The perforations in the floor mat 2 would eventually become clogged with dirt or debris tracked through the aircraft cabin or aircraft galley. With the perforations being clogged, they would cease to allow air to escape from the air filled voids 8 trapped between the floor mat 2 and the subfloor 4. Additionally, the debris clogging the perforations in the floor mat 2 would be difficult to clean.

SUMMARY

The laminate structure or more specifically the laminate aircraft cabin floor structure of this disclosure overcomes the problem of bubbling and/or buckling of the air impermeable aircraft cabin floor mat due to air pockets or air filled voids trapped between the floor mat and the aircraft cabin subfloor being at a higher pressure than the aircraft cabin pressure.

The aircraft cabin subfloor is formed with a first rigid sheet having a plurality of flow paths through the first rigid sheet. A plurality of perforations are formed through the first rigid sheet. The perforations form portions of the plurality of flow paths.

An open cell core panel is secured to the first rigid sheet. The open cells of the open cell core panel together with the plurality of perforations through the first rigid sheet form portions of the pressure equalizing flow paths through the subfloor.

A second rigid sheet is secured to an opposite side of the open cell core panel from the first rigid sheet. The second rigid sheet is formed with a plurality of perforations through the second rigid sheet. Together, the perforations through the first rigid sheet, the open cells through the open cell core panel and the perforations through the second rigid sheet form the flow paths through the subfloor.

An air impermeable floor mat is laid over the first rigid sheet. A loop pattern of adhesive is applied between the air impermeable floor mat and the first rigid sheet, securing the floor mat to the first rigid sheet. The loop pattern of adhesive applied between the air impermeable mat and the first rigid sheet traps pockets of air or air filled voids between the air impermeable floor mat and the first rigid sheet. However, the flow paths through the first rigid sheet, the open cell core panel and the second rigid sheet vent the pockets of air or air filled voids through the subfloor.

Thus, the laminate aircraft cabin floor structure does not have bubbles or buckling formed between the air impermeable floor mat and the subfloor when there is a pressure differential between the opposite top and bottom surfaces of the floor mat.

The features, functions, and advantages that have been discussed can be achieved independently in various embodiments or may be combined in yet other embodiments further details of which can be seen with reference to the following description and drawings.

DESCRIPTION

Figure 1:
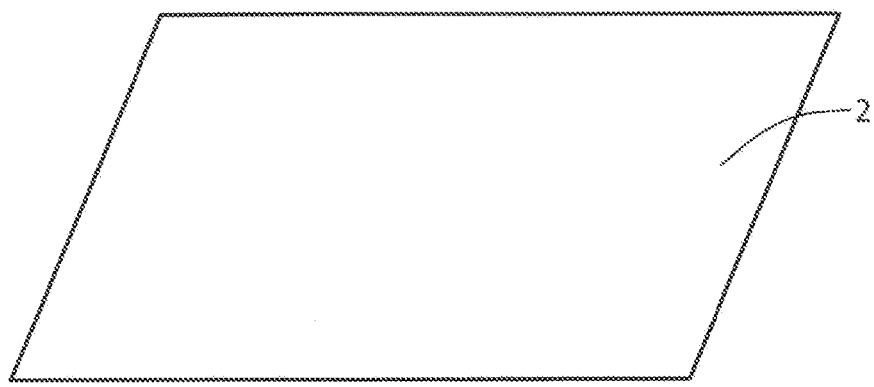
FIG. 1 is a representation of an exploded view of a known aircraft cabin subfloor construction in which air pockets become trapped between an air impervious floor mat and the subfloor.
Figure 1:
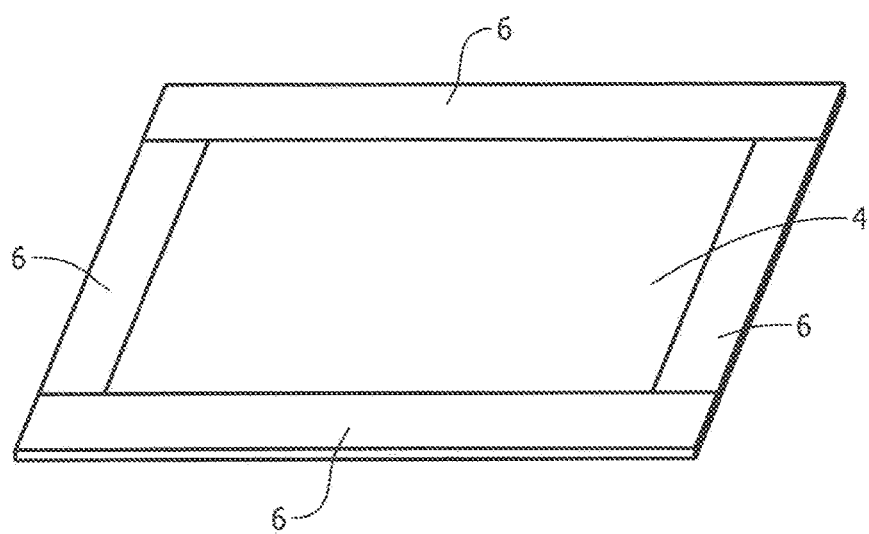
Figure 2:
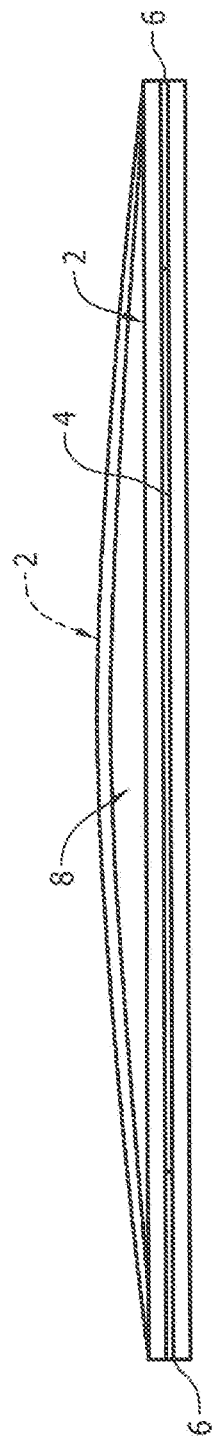
FIG. 2 is a representation of a cross-section view of the aircraft cabin subfloor construction and air impermeable mat of FIG. 1.
Figure 3:
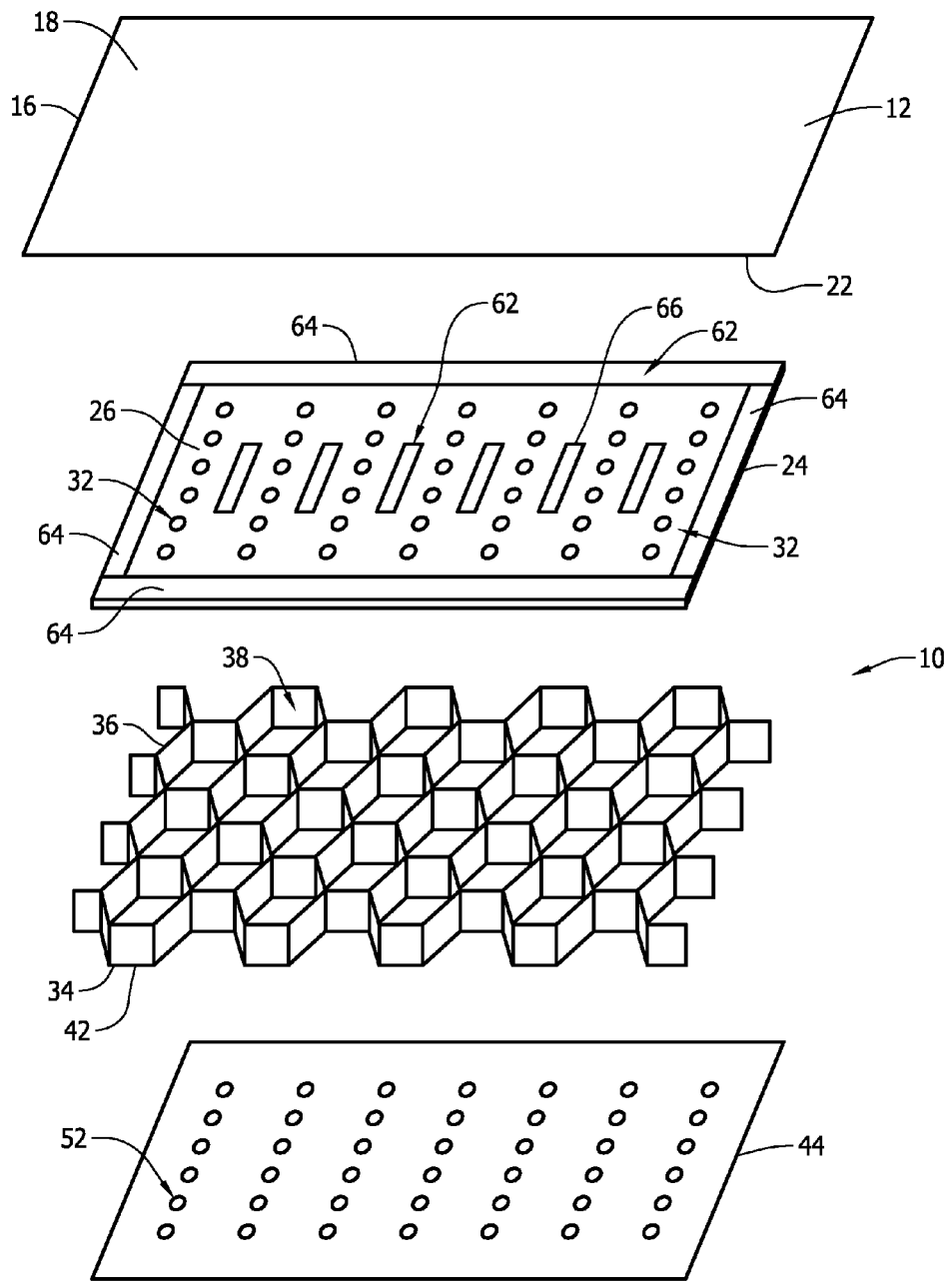
FIG. 3 is a representation of an exploded view of the aircraft cabin pressure regulating subfloor of this disclosure.
Figure 4:
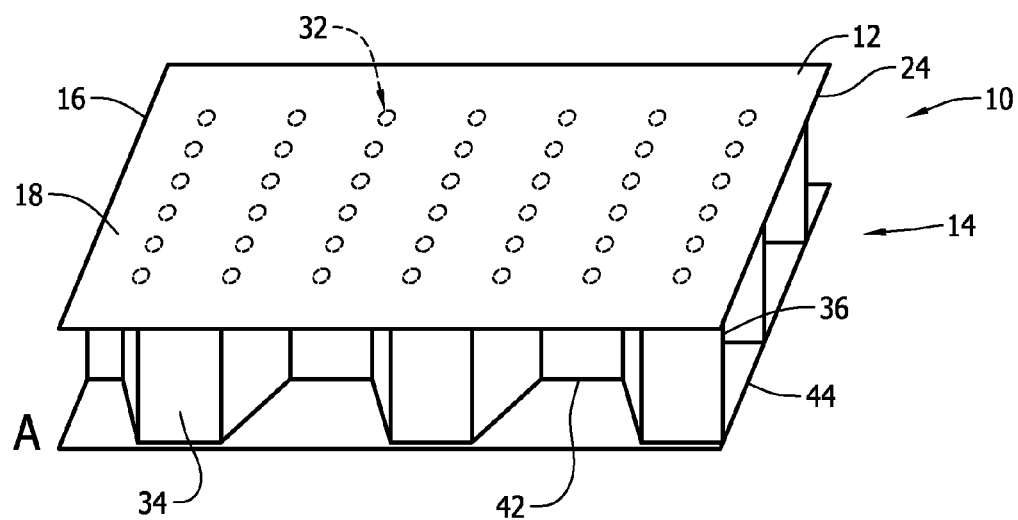
FIG. 4 is a representation of a perspective view of the aircraft regulating subfloor of FIG. 3.
Figure 5:
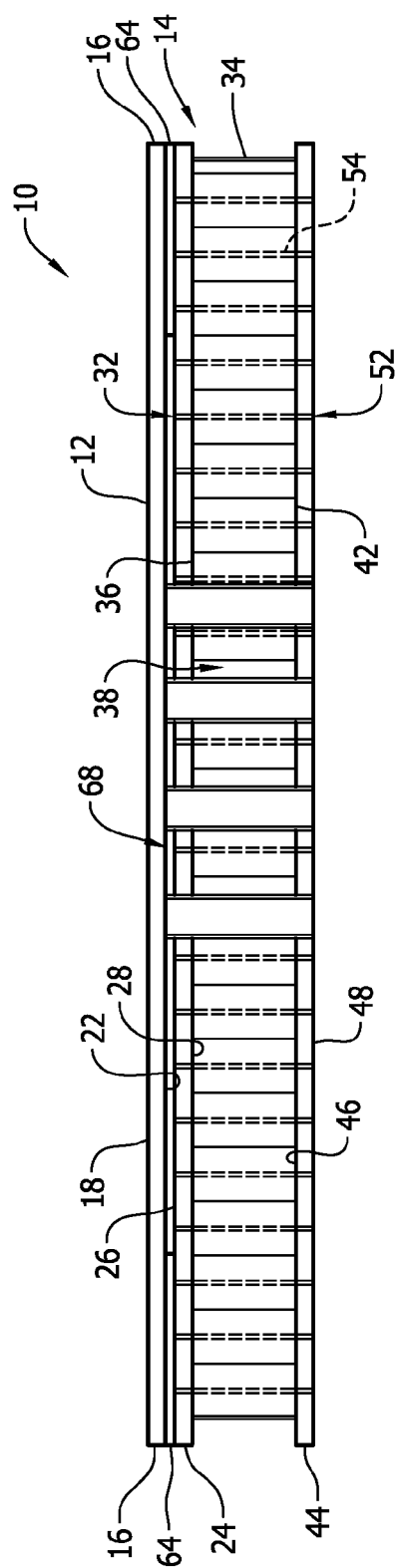
FIG. 5 is a representation of a cross-section view of the aircraft cabin pressure regulating subfloor of this disclosure.

A laminate aircraft cabin floor structure 10 (also referred to as a laminate structure) of this disclosure is represented in FIGS. 3-5. The floor structure is basically comprised of an air impermeable floor mat 12 and an aircraft cabin subfloor 14.

The air impermeable floor mat 12 is basically constructed as a conventional aircraft floor mat. The air impermeable floor mat 12 has a top surface 18 and an opposite bottom surface 22. The floor mat 12 represented in the drawing figures is shown as having a general rectangular configuration. However, in practice the floor mat 12 will have a peripheral border or edge 16 that conforms to the configuration of the subfloor of an aircraft cabin. In other embodiments, the floor mat 12 will have a peripheral edge configuration that conforms to at least portions of the aircraft cabin subfloor where a plurality of floor mats, positioned side by side, will cover areas of the aircraft cabin subfloor where an air impermeable mat is desired in the aircraft cabin. The floor mat 12 has no perforations or other equivalent openings through the floor mat in which dirt and debris could collect and become trapped.

The aircraft cabin subfloor 14 is formed with a first rigid sheet 24. In the illustrated embodiment the first rigid sheet 24 is a first face sheet 24 of composite material. Other equivalent materials could be employed to construct the first face sheet 24. The first face sheet 24 has a substantially flat top surface 26 and an opposite bottom surface 28. A plurality of perforations 32 are formed through the first face sheet 24. The plurality of perforations 32 form a plurality of flow paths through the first face sheet 24.

An open cell core panel 34 is secured to the first face sheet 24. The open cell core panel has a top surface 36 defined by the top edges of cell walls that surround each open cell 38 of the core panel, and an opposite bottom surface 42 defined by the bottom edges of the cell walls that surround each open cell 38. In the illustrated embodiment, the open cell core panel 34 is constructed of a composite material. Other equivalent types of materials could be employed in constructing the open cell core panel 34. The open cell core panel top surface 36 is secured to the first face sheet bottom surface 28 by adhesives or other equivalent means. With the open cell core panel 34 secured to the first face sheet bottom surface 28, the plurality of perforations 32 through the first face sheet 24 and the plurality of open cells 38 through the open cell core panel 34 define flow paths through the first face sheet 24 and the open cell core panel 34.

Other structures equivalent to the open cell core panel 34 could be secured to the first face sheet bottom surface 38 to reinforce the first face sheet 24, for example floor beams. In such an alternative embodiment, the plurality of perforations 32 through the first face sheet 24 and the spaces between the floor beams will define a plurality of flow paths through the first face sheet 24 and the floor beams.

A second rigid sheet 44 is secured to the opposite side, or the bottom surface 42 of the open cell core panel 34 from the first rigid face sheet 24. In the illustrated embodiment, the second rigid sheet 44 is a second face sheet 44 of composite material. Other equivalent materials could be employed to construct the second face sheet 44. The second face sheet has opposite top 46 and bottom 48 surfaces. The second face sheet top surface 46 is secured to the open cell core panel bottom surface 42 by adhesives or other equivalent means. A plurality of perforations 52 are formed through the second face sheet. Together, the plurality of perforations 32 through the first face sheet 24, the open cells 38 through the open cell core panel 34 and the plurality of perforations 52 through the second face sheet 44 from flow paths 54 through the subfloor 14.

The air impermeable floor mat top surface 18 functions as the carpet surface in an aircraft cabin. The floor mat 12 is laid over the first face sheet top surface 26 with the floor mat bottom surface 22 opposing the first face sheet top surface 26.

An adhesive 62 applied between the air impermeable floor mat bottom surface 22 and the first face sheet top surface 26 secures the floor mat 12 to the subfloor 14. The adhesive 62 could be double sided tape, or any equivalent type of adhesive. As represented in the drawing figures, a loop pattern of adhesive 64 is applied between the air impermeable floor mat bottom surface 22 and the first face sheet top surface 26. Additional or alternative patterns of adhesive 66 could be applied between the air impermeable mat bottom surface 22 and the first face sheet top surface 26. The loop pattern of adhesive 64 applied between the air impermeable mat bottom surface 22 and the first face sheet top surface 26 traps pockets of air or forms air filled voids 68 between the air impermeable floor mat 12 and the first face sheet 24. However, the flow paths 54 through the first face sheet perforations 32, the open cells 38 of the open cell core panel 34 and the second face sheet perforations 52 vent the pockets of air or air filled voids 68 trapped between the air impermeable floor mat 12 and the first face sheet 24 of the subfloor 14 to an exterior of the floor structure 10, for example a cargo area or bilge area of an aircraft.

Thus, the aircraft cabin floor structure 10 does not have bubbles or buckling formed between the air impermeable floor mat 12 and the subfloor 14 when there is a pressure differential between the opposite top 56 and bottom 58 surfaces of the floor mat 12. The problem of the air impermeable floor mat 12 bubbling or buckling due to there being a lower air pressure above the air impermeable floor mat 12 than the air pressure in the pockets of air or air filled voids 68 under the air impermeable floor mat 12 is eliminated.

Although the subfloor 14 has been described herein as being comprised of a first face sheet 24, an open cell core panel 34 and a second face sheet 44, other equivalent subfloor constructions could employ the flow paths. For example, the subfloor could be constructed as a solid subfloor with pressure relieving perforations through the subfloor.

The aircraft cabin pressure regulating subfloor provides a method of preventing pressure differential bubbles from forming under an air impermeable floor mat on a subfloor of an aircraft cabin floor. The method involves providing the subfloor with a first rigid sheet having opposite top and bottom surfaces and a plurality of flow paths through the first rigid sheet. The air impermeable floor mat has a peripheral edge. The air impermeable floor mat is secured to the first rigid sheet top surface with air filled voids between the air impermeable mat and the first rigid sheet top surface. The air impermeable floor mat is secured to the first rigid sheet top surface by applying a loop pattern of adhesive between the floor mat adjacent the mat peripheral edge and the first rigid sheet top surface. The loop pattern of adhesive surrounds the air filled void.

The air filled void is vented to an exterior of the subfloor, for example to a cargo area or bilge area of the aircraft through the plurality of flow paths. The plurality of flow paths through the first rigid sheet are formed by a plurality of perforations through the first rigid sheet.

The subfloor could also be formed by securing an open cell core panel to the first rigid sheet bottom surface. The plurality of perforations through the first rigid sheet and the open cells of the open cell core panel create the plurality of flow paths.

Furthermore, the subfloor could be formed by securing a second rigid sheet having opposite top and bottom surfaces and a plurality of perforations through the second rigid sheet to the open cell core panel. The plurality of perforations through the first rigid sheet, the open cells of the open cell core panel and the plurality of perforations through the second rigid sheet create the plurality of flow paths through the subfloor.

As various modifications could be made in the construction of the apparatus and its method of operation herein described and illustrated without departing from the scope of the invention, it is intended that all matter contained in the foregoing description or shown in the accompanying drawings shall be interpreted as illustrative rather than limiting. Thus, the breadth and scope of the present disclosure should not be limited by any of the above described exemplary embodiments, but should be defined only in accordance with the following claims appended hereto and their equivalents.

The invention claimed is:

1. An aircraft cabin subfloor comprising:
a first rigid sheet having opposite top and bottom surfaces the first rigid sheet having a plurality of flow pat through the first rigid sheet;
an air impermeable mat having a top, surface that is a carpet surface of the aircraft cabin subfloor and an opposite bottom surface, the bottom surface of the impermeable mat opposes and is secured to the top surface of the first rigid sheet with an air filled void between the bottom surface of the air impermeable mat and the top surface of the first rigid sheet;
the plurality of flow paths through the first rigid sheet a configured to vent the air filled void to an exterior of the aircraft cabin subfloor;
a pattern of adhesive applied between the bottom surface of the air impermeable mat and the top surface of the first rigid sheet, the pattern of adhesive securing the bottom surface of the air impermeable mat to the top surface of the first rigid sheet and the pattern of adhesive surrounding the air filled void between the bottom surface of the air impermeable mat and the top surface of the first rigid sheet;
a plurality of perforations through the first rigid sheet, the plurality of perforations at least partially forming the plurality of flow paths;
an open cell core panel having a top surface and an opposite bottom surface, the top surface of the open cell core panel being secured to the bottom surface of the first rigid sheet; and,
the plurality of perforations through the first rigid sheet and open cells of the open cell core panel at least partially forming the plurality of flow paths.

2. The aircraft cabin subfloor of claim 1, further comprising:
the pattern of adhesive further comprises a loop pattern of adhesive applied between the bottom surface of the air impermeable mat and the top surface of the first rigid sheet, the loop pattern of adhesive securing the bottom surface of the air impermeable mat to the top surface of the first rigid sheet and the loop pattern of adhesive surrounding the air filled void between the bottom surface of the air impermeable mat and the top surface of the first rigid sheet.

3. The aircraft cabin subfloor of claim 1, further comprising:
the bottom surface of the air impermeable mat having a peripheral edge; and,
the pattern of adhesive is applied to the bottom surface of the air impermeable mat adjacent the peripheral edge.

4. The aircraft cabin subfloor of claim 1, further comprising:
a second rigid sheet having opposite top and bottom surfaces and a plurality of perforations through the second rigid sheet, the top surface of the second rigid sheet being secured to the bottom surface of the open cell core panel; and,
the plurality of perforations through the first rigid sheet, the open cells of the open cell core panel, and the plurality of perforations through the second rigid sheet forming the plurality of flow paths.

5. The aircraft cabin subfloor of claim 4, further comprising:
the first rigid sheet being a first facesheet of composite material;
the open cell core panel being an open cell core panel of composite material; and,
the second rigid sheet being a second facesheet of composite material.

6. An aircraft cabin subfloor comprising:
a first facesheet having a substantially flat top surface and an opposite bottom surface, and the first facesheet having a plurality of perforations through the first facesheet;
an open cell core panel having a top surface and an opposite bottom surface, the top surface of the open cell core panel being secured to the bottom surface of the first facesheet;
a second facesheet having a top surface and an opposite bottom surface, the top surface of the second facesheet being secured to the bottom surface of the open cell core panel, and the second facesheet having a plurality of perforations through the second facesheet;
an air impermeable mat having a top surface that is a carpet surface of the aircraft cabin subfloor and an opposite bottom surface, the bottom surface of the air impermeable mat opposes and lays over the top surface of the first facesheet;
a loop pattern of adhesive applied between the bottom surface of the air impermeable mat and the top surface of the first facesheet, the loop pattern of adhesive securing the bottom surface of the air impermeable mat to the top surface of the first facesheet, the loop pattern of adhesive surrounding an air filled void between the bottom surface of the air impermeable mat and the top surface of the first facesheet; and,
the plurality of perforations through the first facesheet, open cells of the open cell core panel, and the plurality of perforations through the second facesheet creating a plurality of flow paths from the air filled void, through the first facesheet, through the open cell core panel, and through the second facesheet, the plurality of flow paths configured to vent the air filled void to an exterior of the aircraft cabin subfloor.

7. The aircraft cabin subfloor of claim 6, further comprising;
the aircraft cabin subfloor being an aircraft galley floor.

8. The aircraft cabin subfloor of claim 6, further comprising:
the air impermeable mat having a peripheral edge; and,
the loop pattern of adhesive being applied to the peripheral edge of the air impermeable mat.

* * * * *

UNITED STATES PATENT AND TRADEMARK OFFICE
CERTIFICATE OF CORRECTION

PATENT NO. : 10,160,533 B2
APPLICATION NO. : 14/494131
DATED : December 25, 2018
INVENTOR(S) : Rocke R. Koreis It is certified that error appears in the above-identified patent and that said Letters Patent is hereby corrected as shown below:

In the Claims

Column 5, In Claim 1, in Lines 2-3, "bottom surfaces the" is changed to --bottom surfaces, the--. In Line 3, "flow pat" is changed to --flow paths--. In Line 5, "top, surface" is changed to --top surface--. In Line 8, "impermeable mat" is changed to --air impermeable mat--. In Line 12, "sheet a" is changed to --sheet are--.

Signed and Sealed this
Twelfth Day of February, 2019

Andrei Iancu
*Director of the United States Patent and Trademark Office*